United States Patent [19]
Looker

[11] 3,904,064
[45] Sept. 9, 1975

[54] CARGO CONTAINER WITH REMOVABLE DOORS

[75] Inventor: Robert Looker, Carpenteria, Calif.

[73] Assignee: Satco, Inc., El Segundo, Calif.

[22] Filed: Nov. 23, 1973

[21] Appl. No.: 418,252

[52] U.S. Cl. .................. 220/1.5; 49/155; 49/464; 49/465; 220/315; 220/346; 292/57; 292/DIG. 32
[51] Int. Cl.² ........................................ B65D 87/12
[58] Field of Search ............ 49/463, 464, 465, 152, 49/153, 155, 194–196; 220/315, 318, 324, 346, 350, 354, 1.5; 244/118 R; 292/57, 59, DIG. 32

[56] References Cited
UNITED STATES PATENTS

| | | | |
|---|---|---|---|
| 152,848 | 7/1874 | Lamb | 292/57 |
| 3,128,897 | 4/1964 | Wilkins | 220/1.5 |
| 3,587,900 | 6/1971 | Millar et al. | 220/1.5 |
| 3,841,516 | 10/1974 | Marz | 220/1.5 |

*Primary Examiner*—George E. Lowrance
*Assistant Examiner*—Stephen P. Garbe
*Attorney, Agent, or Firm*—George F. Smyth

[57] ABSTRACT

A cargo container comprising a floor, a shell attached to the floor and cooperating therewith to define an enclosure having an opening and a channel on the enclosure extending around at least a portion of the opening. The opening is closeable by a plurality of removable doors, at least one of which is pivotable into position. All of the doors are attached at their upper and lower edges to the enclosure by connections which are resistant to tensile forces acting in a vertical direction.

16 Claims, 9 Drawing Figures

PATENTED SEP 9 1975 3,904,064
SHEET 1 OF 2
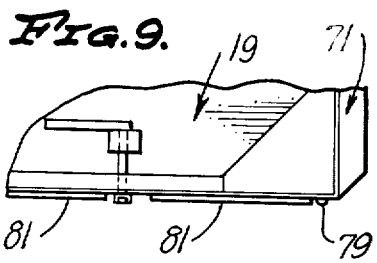
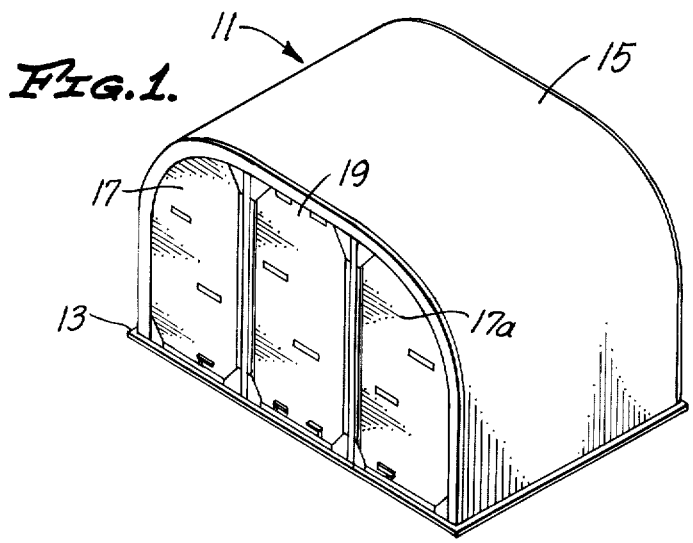
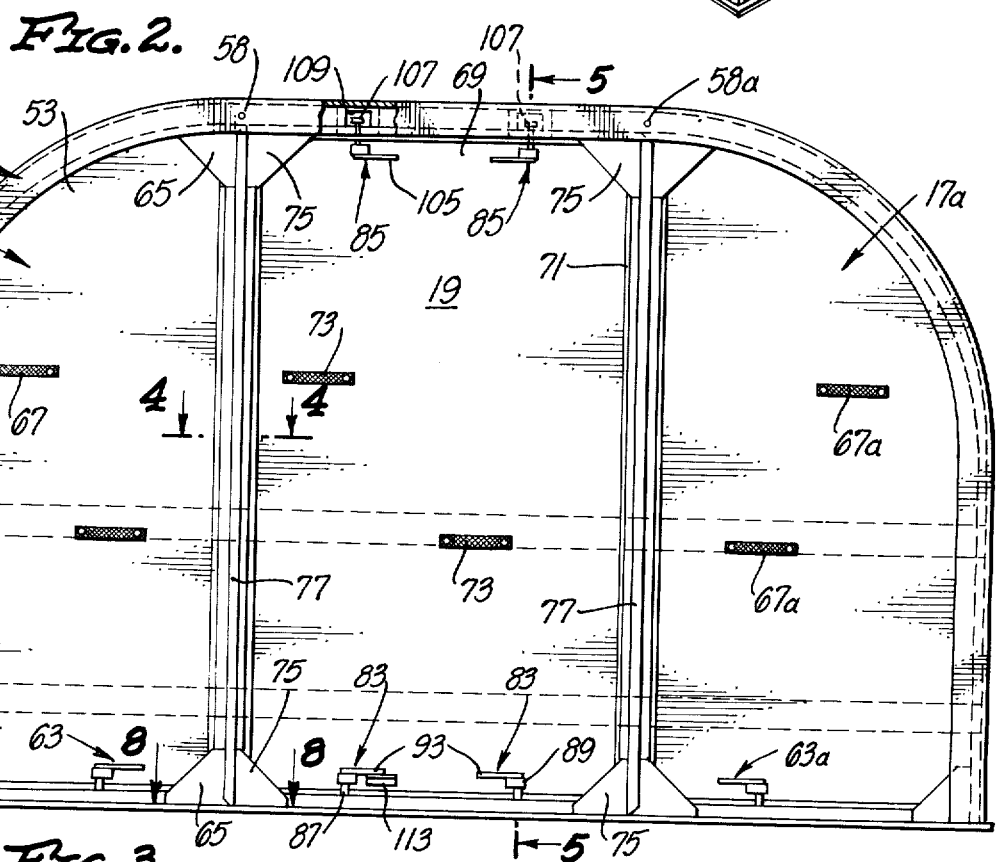
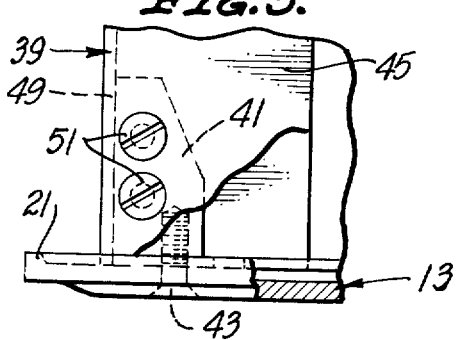
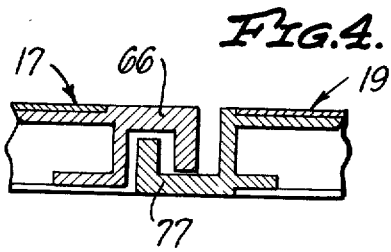

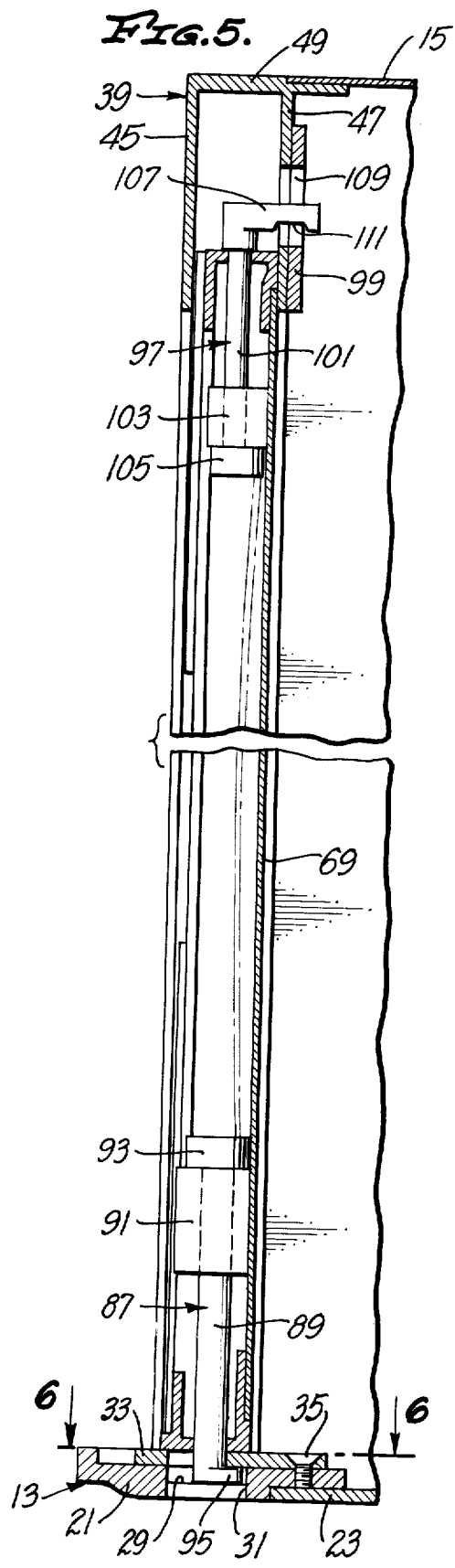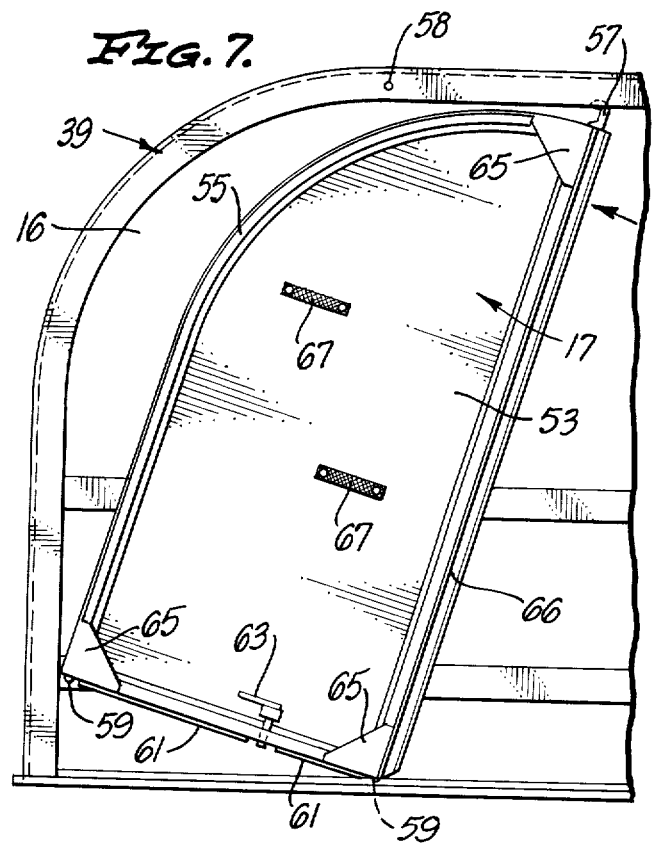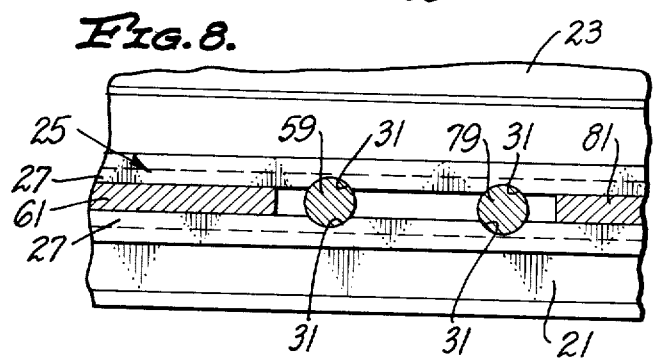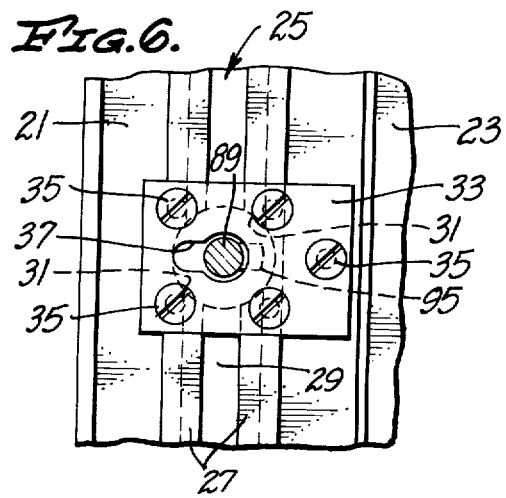

CARGO CONTAINER WITH REMOVABLE DOORS

BACKGROUND OF THE INVENTION

Cargo which is to be transported by air is frequently unitized or containerized by placing it in a cargo container. Typically, a cargo container includes a floor and a shell mounted on the container to form an enclosure. To permit cargo to be loaded into the container and removed from the container, one part of the enclosure is open. This opening can be closed by removable doors. Typically two side doors and a center door are used.

In use, cargo is loaded into the cargo container through the opening. Next, the opening is closed by mounting the removable doors on the enclosure. Unfortunately, with prior art cargo containers, installation and removal of the side doors are often very difficult and at times impossible.

One reason is that the side doors must be slid into position along a generally rectilinear path. Specifically, a length of C-track is located on the floor and the side door has a headed stud or studs which must be inserted into the C-track at one location. The side door is then slid along the C-track to an appropriate position. The C-track must, of necessity, form a relatively close fit with the stud. The rectilinear, sliding motion of the stud in the C-track cannot be carried out easily or at all if the opening has been temporarily or permanently distorted.

The opening may become distorted as a result of the load in the container deflecting the floor when the floor is not on an even, planar supporting surface. As a practical matter, the supporting structure for the floor is very often uneven during loading and unloading. For example, unevenness of the supporting structure may be the result of the cargo container being positioned on a roller support, unlevel ground, etc.

The floor of the cargo container may be in the form or a pallet. It is desirable to use the readily deflectable pallet disclosed in U.S. Pat. No. 3,698,677 for the floor of the cargo container. However, use of this pallet for this purpose is made more difficult because of the substantial deflection which this pallet can undergo.

In a typical prior art construction, each of the side doors has upper and lower projections which are received in upper and low recesses formed in the enclosure. The center door of the prior art construction is positively locked to the side doors at the opposite sides of the center door.

One problem with this construction occurs when the loaded cargo container is transported with the usual conveyors or other cargo handling equipment. Under these circumstances, the floor of the cargo container is unevenly supported, and this causes the floor to deflect in various ways and produce consequent distortion of the opening. The distortion can be also caused by a shift in the load carried in container. In some instances, the distortion of the opening is sufficient to cause the side doors to shift in an askew manner tearing out the connections between the center door and the side doors.

SUMMARY OF THE INVENTION

The present invention facilitates the installation and removal of doors on cargo containers and prevents distortion of the opening. This is accomplished by eliminating the rectilinear, sliding movement of the door which has been necessary heretofore to install and remove the doors. Specifically, the side doors are pivoted rather than moved rectilinearly into position. Pivoting of the doors for installation and removal purposes is possible even though base plane of the container is distorted. Pivoting of the side door as described above eliminates sliding movement of the lower edge of the door along the floor during installation and removal of the door.

This feature can be advantageously embodied in a cargo container which includes a floor on which cargo can be placed, means such as a shell attached to the floor and cooperating therewith to define an enclosure having an opening through which cargo can be loaded into and removed from the cargo container, and a channel on the enclosure extending along at least a portion of the opening. The opening is closeable by a plurality of doors at least one of which is a side door. The side door is pivotable between an initial position in which the door is tilted away from the adjacent side of the opening as the door extends upwardly and an installed position in which the side and upper edges of the door are received within corresponding portions of the channel. With this construction, the upper edge of the door slides within the channel in being pivoted to the installed position.

The pivot axis for the side door is preferably defined by the engagement with the lower inboard corner of the door with the floor. To accurately locate the pivot axis, the door and floor have a cooperating projection and recess.

Interlocking means are provided on the floor and the lower edge of the doors. Another feature of the invention is that the interlocking means is responsive to the pivoting of the side door from the initital position to the installed position to interlock to thereby retain the lower edge of the side door against shear loads. No rectilinear movement of the side door is necessary to cause the interlocking means to interlock. The interlocking means includes a projection and a recess. In order that the floor of the cargo container can be free of projections which would present a tripping hazard and which would inhibit loading and unloading of the cargo container, the projection is preferably formed on the door and the recess is provided in the floor.

The present invention also provides manually operable locking means for attaching the lower edges of the doors to the floor. The locking means maintains the projection and recess of the interlocking means in interlocking relationship notwithstanding deflection of the floor of the cargo container.

In addition, the present invention provides locking means for attaching the doors at their upper edges to the enclosure. The locking means at the upper and lower edges of the doors provide connections which are resistant to vertically directed tensile loads. Accordingly, the doors can be made of relatively light-weight, readily deformable material. In other words, because the upper and lower edges of the door are secured to the enclosure, the center door can deflect under load and need not be heavy and rigid. This also reduces the cost of the doors.

To allow the cargo container to readily deflect, the locking means preferably allows limited relative movement between the upper edge of the doors and the enclosure.

The invention can best be understood by reference to the following description taken in connection with the accompanying illustrative drawings.

BRIEF DESCRIPTION OF THE DRAWINGS

FIG. 1 is a perspective view of a cargo container constructed in accordance with the teachings of this invention.

FIG. 2 is a front elevational view of the cargo container.

FIG. 3 is an enlarged, fragmentary view partially in section showing the attachment of the channel to the floor.

FIG. 4 is an enlarged, fragmentary sectional view taken generally along line 4—4 of FIG. 2 and illustrating how the center and side doors interlock in the installed position.

FIG. 5 is an enlarged, fragmentary sectional view taken generally along line 5—5 of FIG. 2 and showing the locking means of the center door in the locked position.

FIG. 6 is an enlarged fragmentary sectional view taken generally along line 6—6 of FIG. 5 and showing one portion of the forward edge of the floor of the cargo container.

FIG. 7 is a fragmentary, front elevational view illustrating the installation of one of the side doors.

FIG. 8 is a fragmentary plan view taken generally along line 8—8 of FIG. 2 and showing another portion of the forward edge of the floor of the cargo container.

FIG. 9 is a fragmentary front elevational view of a lower corner portion of the center door.

DESCRIPTION OF THE PREFERRED EMBODIMENT

FIG. 1 shows a cargo container 11 which includes a floor 13 and a shell 15 which cooperates with the floor to define an enclosure. The enclosure has an opening 16 (FIG. 7) which is closed by side doors 17 and 17a and a center door 19.

The floor 13 may be of various different constructions, and it may be in the form of a pallet. A pallet constructed in accordance with U.S. Pat. No. 3,698,677 is preferred. This pallet is resiliently deformable under load.

As shown in FIGS. 5, 6 and 8, the floor includes an edge member 21 and a panel 23. The edge member 21 completely circumscribes the panel 23. The edge member 21 provides peripheral reinforcing, resistance to damage, and a portion of the means by which the shell 15 and the doors 17, 17a and 19 are attached to the floor.

The edge member 21 has an elongated upwardly opening recess in the form of a track 25. Although the track 25 could be of various different constructions, in the embodiment illustrated, it is in the form of C-track, the construction of which is well-known by those skilled in the art. Specifically, however, the track 25 includes a pair of spaced parallel flanges 27 above, and partially overhanging, a lower surface 29. Each of the flanges 27 has a plurality of arcuate cutouts 31, with opposed pairs of the cutouts 31 being diametrically opposed.

At four locations along the forward edge of the floor 13, identical plates 33 (FIG. 6) are rigidly affixed to the edge member 21 in any suitable manner such as by screws 35. Each of the plates 33 has a noncircular aperture 37 therein in registry with an opposed pair of the cutouts 31. Each of the plates 33 is recessed into the member 21 and each of the pairs of cutouts 31 in registry with the plate extends completely through the edge member.

The shell 15 includes a channel 39 which extends continuously along the front edge of the enclosure. The channel 39 is attached at its opposite end portions to the floor 13 in any suitable manner such as by the connection shown in FIG. 3. As shown in FIG. 3, a block 41 is attached to the edge member 21 by a screw 43. The channel 39 has an outer leg 45, an inner leg 47, and a web 49 for interconnecting the legs (FIG. 5). The block 41 fits between the legs 45 and 47 and is attached thereto by screws 51. As best seen in FIG. 5, the channel 39 opens toward the doors 17, 17a and 19.

The shell 15 is suitably attached at other locations to the floor 13. These attachments may be in accordance with conventional practices.

The shell 15 may be of various different configurations. In the embodiment illustrated, the shell 15 is generally rectangular in front elevation except for large radii upper corners shown in FIG. 2. This configuration adapts the shell for transport by air. The channel 39 is of an identical configuration as viewed in FIG. 2 and includes opposite side portions and an upper portion.

The side doors 17 and 17a are mirror images of each other. Accordingly, only the side door 17 is described in detail. Portions of the door 17a corresponding to portions of the door 17 are designated by corresponding reference numerals followed by the letter a.

The side door 17 includes a door panel 53 which is completely circumscribed by and attached to peripheral reinforcing 55. The peripheral reinforcing 55 may be of conventional construction. A hook 57 (FIG. 7) is attached to the upper inboard corner of the peripheral reinforcing 55. The hook 57 is adapted to cooperate with a pin 58 which extends between the legs 45 and 47 of the channel 39. Wear members in the form of inboard and outboard steel studs 59 (FIG. 7) are attached to the lower corners of the peripheral reinforcing 55. Elongated rib or tongue sections 61 project downwardly from the lower portion of the peripheral reinforcing 55. Each of the studs 59 is sized to be received within a pair of the opposed cutouts 31 as shown in FIG. 8. The tongue sections 61 are sized to be received in the track 25 between the flanges 27 as shown in FIG. 8. A manually operable lock 63 which is resistant to vertically acting tensile loads is attached to the lower portion of the peripheral reinforcing 55. Although the lock 63 may be of various different constructions, in the embodiment illustrated, it is substantially identical to the lock 83 described hereinbelow with reference to the center door 19. The tongue sections 61 are spaced apart to provide room for the lower projection parts of the lock 63.

The peripheral reinforcing may include gussets 65 at the corners of the door 17 and a seal flange 66 (FIG. 4) extending along the inboard edge of the side door 17. Handles 67 are attached to the door panel 53 to facilitate manual installation and removal of the door.

The center door 19 includes a door panel 69 and peripheral reinforcing 71 which is attached to and completely circumscribes the door panel 69. Handles 73 are attached to the door panel 69 to facilitate manual installation and removal of the door 19.

The peripheral reinforcing 71 may be of conventional construction and include gussets 75 at each of the corners of the center door and a pair of seal flanges 77 which are adapted to cooperate with the seal flanges 66 of the side doors 17 and 17a as shown in FIG. 4.

Wear members in the form of steel studs 79 (FIGS. 8 and 9) are affixed to the lower corners of the peripheral reinforcing 71. A plurality of rib or tongue sections 81 project downwardly from and extend along the lower portion of the peripheral reinforcing 71. Each of the studs 79 is sized to be received within a pair of opposed cutouts 31 in the edge member 21 as shown in FIG. 8. Each of the tongue sections 81 is sized to be received in the track 25 between the flanges 27 as shown in FIG. 8.

A pair of manually operable lower locks 83 and a pair of manually operable upper locks 85 are mounted on the lower and upper portions of the peripheral reinforcing 71, respectively. In the embodiment illustrated, each of the locks 83 is substantially identical to each other and to the locks 63 and 63a, and accordingly only one of the locks 83 is described in detail. The reference numerals applied to the components of the lock 83 are equally applicable to the corresponding components of the locks 63 and 63a. The lock 83 includes a rotatable member 87 (FIGS. 2 and 5) carried by the center door 19 and one of the plates 33 which is mounted on the edge member 21. The rotatable member 87 includes a shaft 89 which is mounted for rotation about a vertical axis by a block 91 which is carried by the door panel 69. The rotatable member 87 also includes a handle 93 affixed to the upper end of the shaft 89 and a radial projection or tab 95 affixed to the lower end of the shaft. In one angular position of the rotatable member 87, the lower end portion of the shaft 89 and the tab 95 can be inserted through the noncircular aperture 37 in the plate 33. The rotatable member 87 can then be rotated to the position shown in FIGS. 5 and 6 in which the tab 95 underlies a portion of the plate 33 to thereby lock the lower edge of the center door 19 to the floor 13.

Each of the upper locks 85 is identical. Each of the upper locks 85 includes a rotatable member 97 (FIG. 5) carried by the door 19, the inner leg 47, and a plate 99 suitably rigidly affixed to the inner leg 47 (FIG. 5). The rotatable member 97 includes a shaft 101 which is mounted for rotational movement about a vertical axis by a block 103 which is suitably mounted on the door panel 69. The rotatable member 97 also includes a handle 105 attached to the shaft 101 at its lower end, and a locking arm or radial projection 107 attached to the shaft 101 at its upper end.

In a locked position, the arm 107 is receivable within and projects through an aperture 109 in the inner leg 47 and the plate 99. The arm 107 has a downwardly opening notch 111 therein which lies within the aperture 109 in the locked position. The lock 85 can be manually pivoted utilizing the handle 105 between the locked position shown in FIG. 5 in which the arm 107 is received within the aperture 109 and a released position in which the arm 107 is within the channel 39 and does not project into the aperture 109.

As shown in FIGS. 2 and 5, the aperture 109 has greater length and width dimensions than the cross sectional dimensions of the arm 107. In other words, in the locked position, the arm 107 is spaced from the surfaces defining the aperture 109. This allows a limited amount of relative movement between the upper edge of the center door 19 and the adjacent regions of the shell 15. In addition, this dimensional relationship allows the arm 107 to be pivoted by the rotatable member 97 into and out of the aperture 109 although channel 39 is slightly deformed.

One or more of the locks 63, 63a, 83 and 85 may be lockable in the locked position. In the embodiment illustrated, a locking plate 113 (FIG. 2) is rigidly affixed to the center door 19 immediately below the handle 93 of one of the locks 83. The handle 93 can be affixed to the locking plate 113 in any suitable manner such as by a padlock (not shown) extending through aligned apertures in the handle 93 and the plate 113.

Assuming that the doors 17, 17a and 19 are removed to expose the opening 16 as shown in FIG. 7, the side doors 17, 17a are first installed and thereafter the center door 19 is installed. Specifically, the side door 17 is placed in an initial position as shown in FIG. 7 in which the inboard ball 59 is received in a pair of the opposed cutouts 31 as shown in FIG. 8. In the initial position the door 17 is tilted away from the adjacent side of the enclosure 15 as it extends upwardly. In other words, the longitudinal axis of the door 17 is tilted toward the center of the opening 16 as the door extends upwardly. As shown in FIG. 7, the door 17 is in the plane defined by the channel 39.

To install the door 17, it is simply pivoted counterclockwise as viewed in FIG. 7 to the installed position shown in FIG. 2. The pivot axis of this movement is defined by the cooperation between the inboard stud 59 and the mating cutouts 31. The pivot axis is perpendicular to the plane of the door 17 and passes through or closely adjacent the inboard stud 59.

In the installed position, the side and upper edges of the door 17 are received within the side and upper portions, respectively, of the channel 39. The hook 57 is in interlocking engagement with the pin 58. Also, the tongue sections 61 are received in the track 25 between the flanges 27 as shown in FIG. 8 and the outboard ball 59 is received within an opposed paid of the cutouts 31. By positioning the rotatable member of the lock 63 in the released position prior to pivoting the door to the installed position, the lower end of the shaft 89 and the radial projection 95 will pass through the aperture 37 in an appropriately located plate 33. When the side door 17 is in the installed position, the handle of the lock 33 can be rotated to the locked position.

The installing motion for the side door 17 is entirely a pivoting motion and no rectilinear movement of the door 17 is necessary to move the door between the initial and installed positions. Obviously, it is necessary to appropriately locate one of the plates 33 for cooperation with the lock 63 and to appropriately locate opposed pairs of the cutouts 31 for cooperation with the studs 59. Similarly, the track 25 must provide mating recesses for the tongue sections 61. When this is done, pivotal movement of the door to the installed position automatically results in interlocking the tongue sections 61 in the track 25.

The second step in closing the opening 16 is to insert the side door 17a. This is accomplished in the same manner described hereinabove with reference to installation of the door 17. Thus, the door 17a is appropriately positioned and tilted toward the center of the opening 16 as it extends upwardly and then pivoted clockwise as viewed in FIG. 2 to the installed position shown in FIG. 2.

With the side doors 17 and 17a installed, the center door 19 is then installed. This is accomplished by inserting the upper edge of the center door 19 upwardly into the channel 39 as far as it will go. The lower end of the center door 19 can then be swung inwardly into alignment with the track 25. The center door 19 is then lowered. This places each of the balls 79 into interlocking relationship with an associated pair of the cutouts 31 and places the tongue sections 81 into the track 25 between the flanges 27. In addition, with the rotatable members 87 in a releasing position, the tabs 95 are inserted through apertures 27 of corresponding plates 33 as a result of lowering the center door. Next, the locks 63, 63a, 83 and 85 are moved to the locked position by appropriate manual rotation of the handles.

By padlocking the handle 93 to the locking plate 113, unauthorized removal of any of the doors 17, 17a and 19 is prevented. The sealing flanges 66 and 77 interlock to provide a sufficiently tight joint along the longitudinal edges of the center door 19, yet provide for relative movement therebetween.

The studs 59 and 79 perform several important functions. First, the inboard stud 59 of each of the side doors 17 and 17a cooperates with an associated pair of the cutouts 31 to define the pivot axis for the side doors and to properly locate the side doors in the initial position. Secondly, each of the studs 59 and 79 interlock with the surfaces defining the associated pairs of the cutouts 31 to tend to prevent movement of the associated door longitudinally of the track and transversely of the door. As such, this interlocking relationship is effective against shear loads acting in these directions. Thirdly, each of the studs 59 and 79 is constructed of a material which is harder than the material from which the associated door is constructed. For example, each of the studs 59 and 79 may be constructed of steel and as such provide a hard wear-resistant surface which prolongs the life of the doors.

The interlocking relationship between the tongue sections 61 and 81 and the track 25 as shown in FIG. 8 is useful in resisting shear loads acting in a plane transverse to the plane of the doors 17, 17a and 19. The lock 63 and the cooperation between the hook 57 and the pin 58 are primarily effective against tensile loads acting vertically of the side door 17. The lock 63 is manually operable and the hook 57 and the pin 58 are not manually operable. For example, an outwardly directed force perpendicular to the central region of the side door 17 would tend to bend the door outwardly. If the locks 63 were not provided, this bending load would tend to pull the tongue sections 61 out of the track 25. However, because the lock 63 resists this tensile load, cooperative locking engagement between the tongue sections 61 and the track 25 is maintained. Similarly, the hook 57 and the pin 58 maintain the upper edges of the door 17 within the channel 39. The outboard side of the door 17 is retained by the side of the channel 39. The side door 17 is held in the installed position by the other side door 17a and the center door 19.

The locks 83 are effective in tension in the same manner described hereinabove with reference to the lock 63. Similarly, the locks 85 are effective in tension in the same manner as the locks 83 except that the former, by virtue of the oversized apertures 109, allows limited relative movement between the upper regions of the center door 19 and the adjacent region of the enclosure 15 before becoming effective as a lock.

Because the doors 17, 17a and 19 are retained against tensile loads along their upper and lower edges, these doors can be made resiliently deformable in response to outward bending forces. This allows the doors 17, 17a and 19 to be made lighter than corresponding conventional doors.

To remove the doors 17, 17a and 19, the procedures described above is reversed. Specifically, the center door 19 is first removed and thereafter the side doors 17 and 17a can be removed by simply reversing the installation procedure.

Any numbers of the locks 63, 63a, 83 and 85 can be provided and the numbers illustrated in FIG. 2 are purely illustrative. Obviously, the number and location of the plates 33 will depend upon the number and location of the locks 63, 63a and 85. Similarly, in the embodiment illustrated, six parts of the opposed cutouts 31 are provided because six of the studs 59 and 79 are provided on the doors. Obviously, the location of the opposed cutouts 31 is selected in accordance with the desired location for the balls 59 and 79. Although other materials can be utilized, the shell 15, the doors 17 and 17a, and the center door 19 can advantageously be constructed of aluminum.

In the embodiment illustrated, the door 19 is rectangular. Each of the side doors 17 is rectangular except to the extent that it must curve to conform to the curvature of the channel 39.

Although an exemplary embodiment of the invention has been shown and described, many changes, modifications and substitutions may be made by one with ordinary skill in the art without necessarily departing from the spirit and scope of this invention.

I claim:
1. A cargo container comprising:
 a floor on which cargo can be placed;
 means attached to said floor and cooperating therewith to define an enclosure having an opening through which cargo can be loaded into and removed from the cargo container;
 a channel on said enclosure extending along at least a portion of said opening, said channel having a side portion which extends along one side of said opening and an upper portion which extends along the upper side of said opening, said channel opening toward said opening;
 a side door sized to close a portion of said opening adjacent said one side, said side door having a side edge, a lower edge, and an upper edge, said side door being pivotable about a pivot axis between an initial position in which the door is tilted away from said one side as the door extends upwardly and an installed position in which the side edge and the upper edge of said door are received within the side portion and the upper portion, respectively, of said channel; and
 interlocking means on said lower edge of said side door and said floor responsive to the pivoting of the side door from the initital position to the installed position to interlock to retain the lower edge of the door against loads acting generally transverse to the side door, said interlocking means including an upwardly opening recess in said floor and a cooper- ating projection on said door adapted to be received within said recess.

2. A cargo container as defined in claim 1 wherein said side door has a lower inboard corner region, said pivot axis extends generally transverse to said side door and through the lower inboard corner region of said side door.

3. A cargo container as defined in claim 1 including a projection extending downwardly from said side door adjacent a lower inboard corner of said side door, and means on said floor cooperable with said projection to define said pivot axis.

4. A cargo container as defined in claim 1 including locking means for attaching said door adjacent said lower edge thereof to said floor, said locking means providing a connection between said door and said floor which is resistant to tensile loads tending to pull the door upwardly away from the floor.

5. A cargo container as defined in claim 4 wherein said locking means includes a rotatable member carried by said door and projecting downwardly, a radial projection carried by said rotatable member and projecting radially thereof, means on said floor cooperable with said radial projection in at least one angular position thereof to lock the side door to the floor.

6. A cargo container as defined in claim 1 wherein said recess includes an elongated upwardly opening slot in said floor and said projection includes an elongated tongue receivable in said slot.

7. A cargo container as defined in claim 1 wherein said projection includes a steel wear member and said side door is constructed at least in substantial part of aluminum.

8. A cargo container as defined in claim 1 wherein said door means includes a second door, second locking means for attaching the upper and lower edges of said second door to an upper portion of said enclosure and to said floor, respectively, said second locking means providing connections which are effective against tensile forces acting generally in the plane of said second door, said second locking means allowing limited relative movement between the upper edge of said second door and the portion of said enclosure to which said upper edge of said second door is attached by said locking means.

9. A cargo container comprising:
a floor on which cargo can be positioned;
means on said floor and cooperating therewith to define an enclosure having an opening through which cargo can be loaded into and removed from the cargo container;
a channel on said enclosure extending along the enclosure above said opening;
a removable door sized to close at least a portion of said opening, said door being resiliently deformable in response to outward bending loads applied to the door, said door having an upper edge receivable within said channel and a lower edge;
first releasable locking means for attaching the upper edge of said door to an upper portion of said enclosure;
second releasable locking means for attaching a lower edge of the door to said floor;
said first and second locking means providing upper and lower releasable connections, respectively, between the door and the enclosure, said first releasable locking means including a member engageable with said channel and providing the upper connection retaining said door against separation from said enclosure in response to downwardly directed tensile loads and the second releasable locking means including a member engageable with said means and providing said lower connection to retain said door against separation from said enclosure in response to upwardly directed tensile loads, whereby said first and second locking means are effective to retain said door on said enclosure when outwardly directed bending loads are applied to said door to produce downwardly and upwardly directed tensile loads in said door at the upper and lower segments thereof, respectively, and
at least one of said locking means including manually operable means for selectively locking and releasing the associated locking means.

10. A cargo container as defined in claim 9 wherein said first locking means allows limited relative movement between the upper edge of said door and the portion of said enclosure to which said door is attached by said first locking means.

11. A cargo container as defined in claim 10 wherein said channel includes inner and outer spaced members, said first locking means including an aperture in said inner member and a rotatable member, a portion of said rotatable member being movable into said aperture to thereby attach said door adjacent the upper edge thereof to said channel, said aperture being oversized vertically relative to said portion of said rotatable member to thereby provide for said limited relative movement.

12. A cargo container as defined in claim 9 wherein each of said locking means includes a manually operable rotatable member, an aperture in said enclosure, and a portion of said rotatable member being insertable into said aperture and cooperable therewith to provide one of said connections.

13. A cargo container comprising:
a floor on which cargo can be positioned;
means on said floor and cooperating therewith to define an enclosure having an opening through which cargo can be loaded into and removed from the cargo container;
a first side door sized to close a side portion of said opening, said first side door being pivotable between an initial position in which the first side door is tilted away from the adjacent side of the opening as the first side door extends upwardly and an installed position in which the first side door closes the side portion of said opening;
interlocking means on said lower edge of said first side door and said floor responsive to the pivoting of said first side door from the initial position to the installed position to interlock;
a removable center door having upper and lower edges;
locking means for attaching the upper and lower edges of said center door to an upper portion of said enclosure and to said floor, respectively, the attachment between said door and the upper and lower portions of the enclosure being resistant to tensile loads applied thereto; and
a second side door between said center door and side of said opening opposite said first side door, said first side door, said second side door and said center door cooperating to substantially completely close said opening.

14. A cargo container as defined in claim 13 including a steel wear member extending downwardly from the lower edge of one of said door.

15. A cargo container comprising:
a floor on which cargo can be placed;
means on said floor and cooperating therewith to define an enclosure having an opening through which cargo can be loaded into and removed from the cargo container;
a channel on said enclosure, at least a portion of said channel being above said opening, said portion of said channel opening downwardly and including inner and outer spaced members;
a removable door sized to close at least a portion of said opening, said door having an upper edge receivable within said channel between said inner and outer members and a lower edge;
at least one rotatable member carried by said door;
a radial projection carried by said rotatable member;
said inner member having an aperture therein, said rotatable member being rotatable between a locked position in which the radial projection is received within said aperture and a released position in which the radial projection is out of said aperture whereby the upper edge of the door can be selectively attached to or detached from said channel;
at least one of the dimensions of said aperture being larger than the corresponding dimensions of the portion of said radial projection which is received therein in said locked position whereby the radial projection and the aperture cooperate to allow the door to move relative to the enclosure a limited amount; and
means for connecting the lower edge of said door to said floor.

16. A cargo container as defined in claim 15 wherein the horizontal and vertical dimensions of said aperture are larger than the horizontal and vertical dimensions, respectively, of the portion of said radial projection which is received in the aperture.

* * * * *